US009265188B2

(12) United States Patent
Thompson et al.

(10) Patent No.: US 9,265,188 B2
(45) Date of Patent: Feb. 23, 2016

(54) SECTIONED METER BOX ASSEMBLY

(71) Applicant: CNH Canada, Ltd., Saskatoon (CA)

(72) Inventors: Dennis George Thompson, Saskatoon (CA); Jared Steven Wright, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 415 days.

(21) Appl. No.: 13/707,899

(22) Filed: Dec. 7, 2012

(65) Prior Publication Data
US 2014/0158204 A1    Jun. 12, 2014

(51) Int. Cl.
| | |
|---|---|
| *A01C 7/00* | (2006.01) |
| *A01C 7/04* | (2006.01) |
| *A01C 7/12* | (2006.01) |
| *A01C 7/20* | (2006.01) |
| *A01C 21/00* | (2006.01) |
| *A01C 19/00* | (2006.01) |
| *A01C 7/08* | (2006.01) |

(52) U.S. Cl.
CPC ... *A01C 7/04* (2013.01); *A01C 7/12* (2013.01); *A01C 7/123* (2013.01); *A01C 7/127* (2013.01); *A01C 7/201* (2013.01); *A01C 19/00* (2013.01); *A01C 21/005* (2013.01); *A01C 7/081* (2013.01); *Y10T 137/0318* (2015.04); *Y10T 137/8593* (2015.04)

(58) Field of Classification Search
USPC .................................. 111/174, 175, 177, 178
See application file for complete search history.

(56) References Cited

U.S. PATENT DOCUMENTS

| | | | | |
|---|---|---|---|---|
| 2,139,080 | A | * | 12/1938 | Heer .............................. 111/52 |
| 3,648,631 | A | * | 3/1972 | Fiedler et al. ................. 111/120 |
| 4,516,670 | A | * | 5/1985 | Sorensen, Jr. ................ 192/48.8 |
| 5,078,066 | A | | 1/1992 | Lafferty |
| 5,358,055 | A | * | 10/1994 | Long et al. .................... 172/470 |
| 6,240,861 | B1 | | 6/2001 | Memory |
| 7,571,688 | B1 | | 8/2009 | Friestad et al. |
| 7,690,440 | B2 | | 4/2010 | Dean et al. |
| 8,001,915 | B2 | | 8/2011 | Friggstad |
| 2002/0178981 | A1 | | 12/2002 | Drummond et al. |

(Continued)

FOREIGN PATENT DOCUMENTS

| | | |
|---|---|---|
| AU | 2012200946 | 9/2012 |
| CA | 2748120 | 7/2012 |

OTHER PUBLICATIONS

PCT International Search Report and Written Opinion dated Apr. 11, 2014.

*Primary Examiner* — Alicia Torres
(74) *Attorney, Agent, or Firm* — Rebecca L. Henkel

(57) ABSTRACT

A metering system for distributing an agricultural product in a field includes a drive input and a drive shaft coupled to the drive input and configured to be driven in rotation by the drive input. The metering system also includes a first meter box assembly having a first housing, a first metering shaft extending through a first plurality of meter rollers within the first housing, and a second metering shaft extending through a second plurality of meter rollers within the first housing. The metering system includes a second meter box assembly having a second housing, a third metering shaft extending through a third plurality of meter rollers within the second housing, and a fourth metering shaft extending through a fourth plurality of meter rollers within the second housing. Each metering shaft is configured to be independently driven by the drive shaft.

18 Claims, 7 Drawing Sheets

(56) References Cited

U.S. PATENT DOCUMENTS

| | | |
|---|---|---|
| 2008/0163807 A1 | 7/2008 | Dean et al. |
| 2010/0132600 A1 | 6/2010 | Dean et al. |
| 2010/0162931 A1 | 7/2010 | Cannon et al. |
| 2010/0307394 A1 | 12/2010 | Snipes et al. |
| 2010/0307395 A1 | 12/2010 | Snipes |
| 2011/0132244 A1 | 6/2011 | Meyer et al. |
| 2011/0172811 A1 | 7/2011 | Chinkiwsky |
| 2011/0178632 A1 | 7/2011 | Straeter |
| 2012/0103238 A1* | 5/2012 | Beaujot et al. ............... 111/174 |

* cited by examiner

SECTIONED METER BOX ASSEMBLY

BACKGROUND

The invention relates generally to agricultural metering systems and, more particularly, to a sectioned meter box assembly for an agricultural metering system.

Generally, seeding implements are towed behind a tractor or other work vehicle. These seeding implements typically include one or more ground engaging tools or openers that form a seeding path for seed deposition into the soil. The openers are used to break the soil to enable seed deposition. After the seeds are deposited, each opener is followed by a packer wheel that packs the soil on top of the deposited seeds.

In certain configurations, an air system is used to meter and deliver agricultural product (e.g., seeds, fertilizer, etc.) to ground engaging tools within the seeding implement. Certain air systems include a metering system configured to deliver metered quantities of product into an airflow that transfers the product to the openers. Certain metering systems are configured to rotate a shaft of a meter box assembly which, in turn, rotates each metering section of the meter box assembly. As such, the metering system may be engaged to provide product to each opener coupled to the meter box assembly, or stopped to block product delivery to each opener. Unfortunately, the metering system may deliver product to openers positioned above soil that has already received product, or soil that should not receive product (e.g., a headland), thereby resulting in wasted product.

BRIEF DESCRIPTION

In one embodiment, a metering system for distributing an agricultural product in a field includes a drive input and a drive shaft coupled to the drive input and configured to be driven in rotation by the drive input. The metering system also includes a first meter box assembly having a first housing, a first metering shaft extending through a first plurality of meter rollers within the first housing, and a second metering shaft extending through a second plurality of meter rollers within the first housing. The metering system includes a second meter box assembly having a second housing, a third metering shaft extending through a third plurality of meter rollers within the second housing, and a fourth metering shaft extending through a fourth plurality of meter rollers within the second housing. Each metering shaft is configured to be independently driven by the drive shaft.

In another embodiment, a metering system for distributing an agricultural product in a field includes a drive input and a drive shaft assembly coupled to the drive input and configured to be driven in rotation by the drive input. The metering system also includes a meter box assembly having a housing, a first metering shaft extending through a first plurality of meter rollers within the housing, and a second metering shaft extending through a second plurality of meter rollers within the housing. The first and second metering shafts are configured to be independently driven by the drive shaft assembly.

In another embodiment, a method for metering agricultural product from an agricultural product metering system includes selectively rotating a first plurality of meter rollers coupled to a first metering shaft in a first housing of a first meter box assembly, and selectively rotating a second plurality of meter rollers coupled to a second metering shaft in the first housing of the first meter box assembly. The first plurality of meter rollers and the second plurality of meter rollers are configured to rotate independently from one another.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
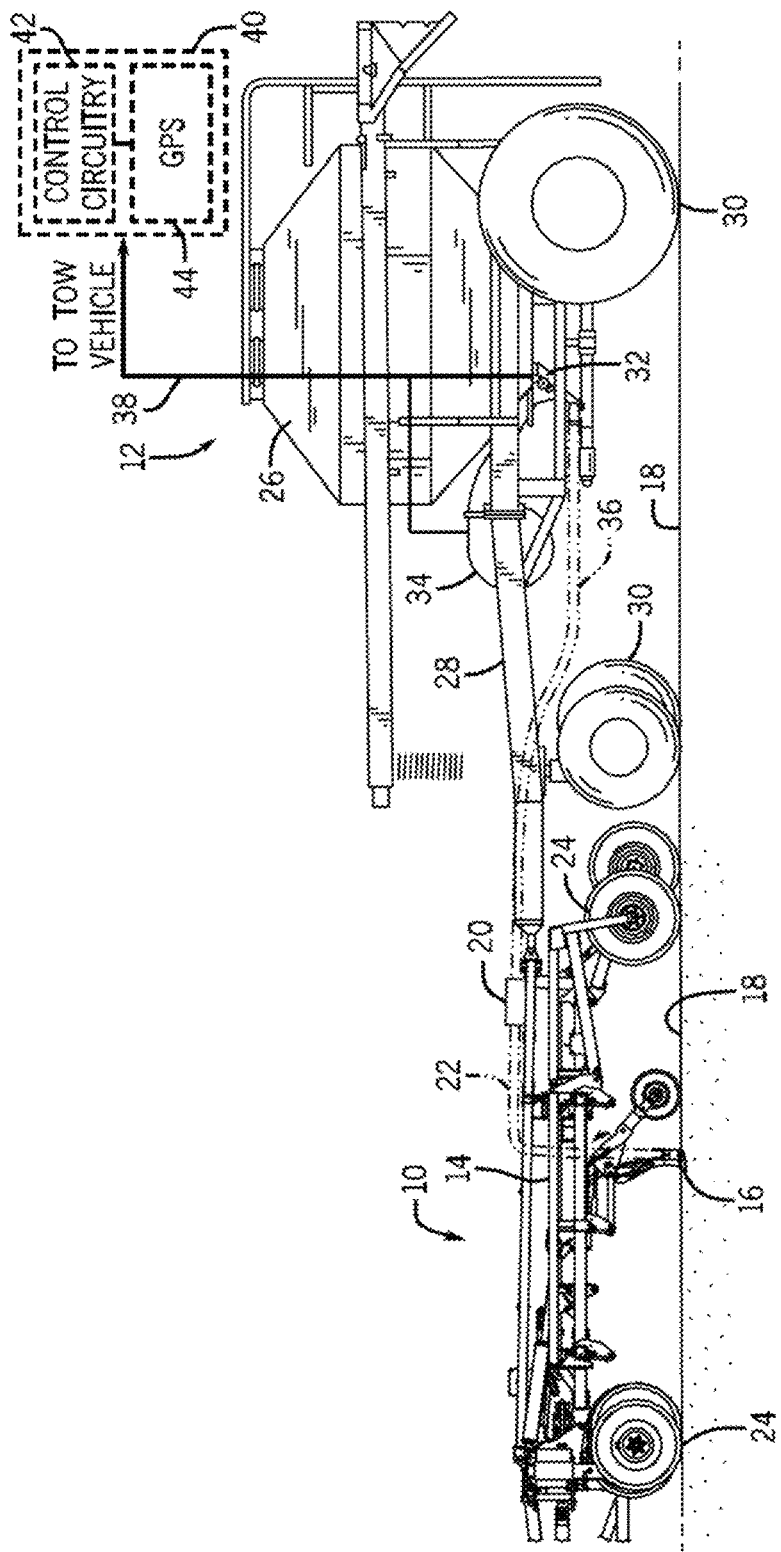
FIG. 1 is a side view of an air system that may employ an embodiment of a sectioned meter box assembly.

FIG. 1 is a side view of an air system, which may employ an embodiment of a sectioned meter box assembly. In the illustrated embodiment, an implement 10 is coupled to an air system 12 (e.g., separate air cart, integral tank arrangement, etc.). The implement 10 includes a tool frame 14 having a ground engaging tool 16. The ground engaging tool 16 is configured to penetrate soil 18 for seed and/or fertilizer deposition into the soil. The ground engaging tool 16 receives product (e.g., seeds, fertilizer, etc.) from a product distribution header 20 via a hose 22. As illustrated, the hose 22 extends from the product distribution header 20 to the ground engaging tool 16 to facilitate product flow to the tool 16.

Although only one ground engaging tool 16, product distribution header 20, and hose 22 are included in the illustrated embodiment, it should be appreciated that the implement 10 may include additional tools 16, headers 20, and/or hoses 22 in alternative embodiments. For example, in certain embodiments, the implement 10 may include one or more distribution headers having multiple hoses extending to respective ground engaging tools 16. In the illustrated embodiment, the implement 10 includes wheel assemblies 24 which contact the soil surface 18 and support the implement 10 during operation and transport.

The air system 12 includes a storage tank 26, a frame 28, wheels 30, a metering system 32, and an air source 34. In certain configurations, the storage tank 26 includes multiple compartments for storing various flowable particulate materials. For example, one compartment may include seeds, and another compartment may include a dry fertilizer. In such configurations, the air system 12 is configured to deliver both the seeds and fertilizer to the implement 10. The frame 28 includes a towing hitch configured to couple to the implement 10 or a tow vehicle. As illustrated, the air system 12 is coupled to the implement 10 via the frame 28. Consequently, the air system 12 is towed behind the implement 10 during planting operations and during transport. In alternative embodiments, the air system 12 may be towed directly behind a tow vehicle, with the implement 10 towed behind the air system 12.

In the present embodiment, seeds and/or fertilizer within the storage tank 26 are gravity fed into the metering system 32. The metering system 32 includes sectioned meter boxes that regulate the flow of material from the storage tank 26 into an air flow provided by the air source 34. The air flow then carries the material through a hose 36 to the implement 10, thereby supplying the ground engagement tool 16 with seeds and/or fertilizer for deposition within the soil. Although only one hose 36 is included in the illustrated embodiment, it should be appreciated that multiple hoses may be utilized within alternative embodiments. Furthermore, the hoses 36 extending from the air system 12 to the distribution headers 20 may have a larger diameter than the hoses extending from the distribution headers 20 to each ground engaging tool 16. For example, the hoses 36 extending to the distribution headers 20 may have a diameter of about 2.5 inches, while the hoses extending to each ground engaging tool 16 may have a diameter of about 1.0 inches. In some embodiments, the hoses 36 extending from the air system 12 to the distribution headers 20 may have about the same diameter as the hoses extending from the distribution headers 20 to each ground engaging tool 16. For example, the hoses 36 extending to the distribution headers 20 may have a diameter of about 1.0 inches and the hoses extending to each ground engaging tool 16 may have a diameter of about 1.0 inches.

In the illustrated embodiment, a communication bus 38 communicatively couples a control assembly 40 to the metering system 32 and to the air source 34. The communication bus 38 enables power and control signals to be provided to the metering system 32 and to the air source 34 to control operation of the air system 12. In certain embodiments, the control assembly 40 may be located on the tow vehicle. However, in other embodiments, at least part of the control assembly 40 may be located on the air system 12. The control assembly 40 includes control circuitry 42 and a spatial locating system, such as the illustrated Global Positioning System (GPS) receiver 44. The control circuitry 42 provides control signals to the air system 12 and may receive geographical position information from the GPS receiver 44 to determine a geographical position of the metering system 32 or the air system 12. As such, the control circuitry 42 may implement "Smart Farming," in which the control circuitry 42 controls the metering system 32 based on the geographical position of the metering system 32. As may be appreciated, the sectioned meter boxes of the metering system 32 may be controlled to selectively meter agricultural product to corresponding portions of the implement, thereby reducing excess distribution of agricultural product.

Figure 2:
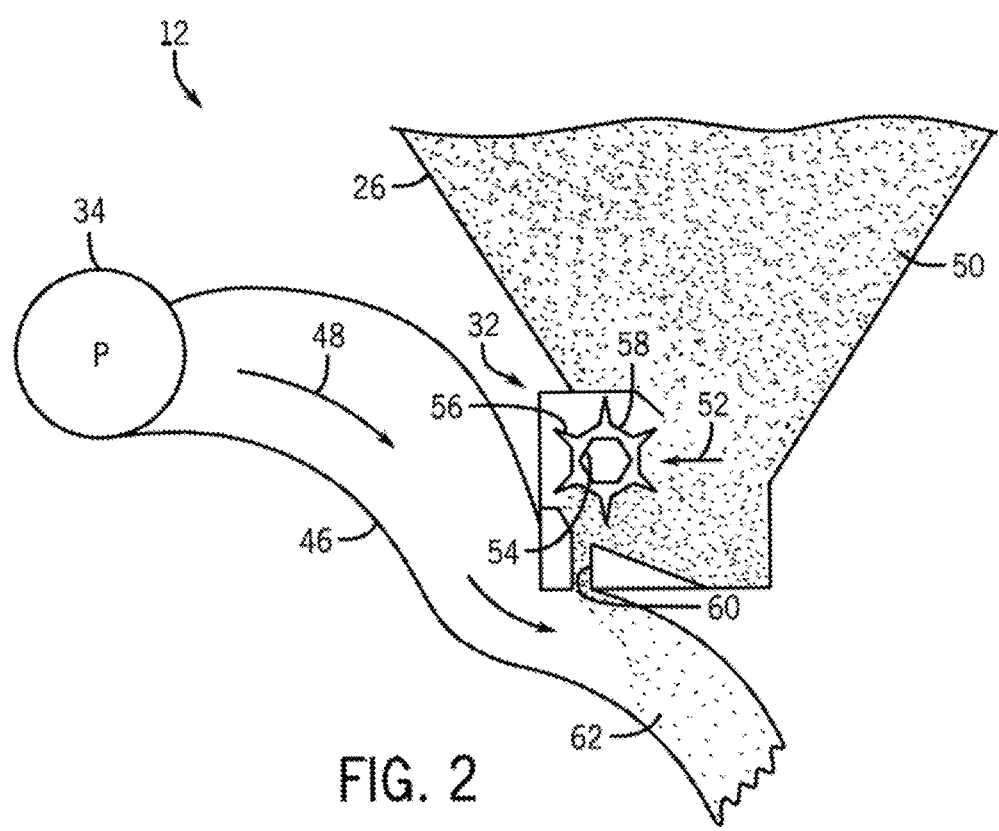
FIG. 2 is a schematic diagram of an exemplary air conveyance system that may be employed within the air system of FIG. 1.

FIG. 2 is a schematic diagram of an exemplary air conveyance system that may be employed within the air system 12 of FIG. 1. As illustrated, the air source 34 is coupled to a conduit 46 extending to the hose 36, and configured to flow air 48 past the metering system 32. In other embodiments, the conduit 46 may include multiple conduit sections, with one conduit section coupling the air source 34 to the top of the metering system 32 and another conduit section coupling the bottom of the metering system 32 to the implement. In such a configuration, air 48 flows through the metering system 32, from top to bottom. The air 48 enters the metering system 32, combines with the metered product, and exits the metering system 32 as a mixture of product and air.

The air source 34 may be a pump or blower powered by an electric or hydraulic motor, for example. Flowable particulate material 50 (e.g., seeds, fertilizer, etc.) within the storage tank 26 flows by gravity into the metering system 32. The metering system 32 includes one or more meter rollers 52 configured to regulate the flow of product 50 into the air flow 48. The one or more meter rollers 52 may be housed in one or more meter box assemblies, as described in detail below. In certain embodiments, the metering system 32 may include multiple meter rollers 52 disposed adjacent to one another along a longitudinal axis of the rollers 52. In other embodiments, the meter rollers 52 may be positioned so their rotational axes are parallel to one another. For example, certain metering systems 32 include eight meter rollers 52 arrange in a linear configuration. Such systems 32 are known as "8-run" metering assemblies. However, alternative embodiments may include more or fewer meter rollers 52, e.g., 5, 6, 7, 8, 9, or more.

Each meter roller 52 includes an interior passage/cavity 54 configured to receive a shaft that drives the meter roller 52 to rotate. In the illustrated embodiment, the cavity 54 has a hexagonal cross section. However, alternative embodiments may include various other cavity configurations (e.g., triangular, square, keyed, splined, etc.). The shaft is coupled to a drive unit, such as an electric or hydraulic motor, configured to rotate the meter rollers 52. Alternatively, the meter rollers 52 may be coupled to a wheel by a gear assembly such that rotation of the wheel drives the meter rollers 52 to rotate. Such a configuration automatically varies the rotation rate of the meter rollers 52 based on the speed of the air system 12.

Each meter roller 52 also includes multiple ridges 56 and flutes 58. The number and geometry of the flutes 58 are particularly configured to accommodate the material 50 being distributed. The illustrated embodiment includes six flutes 58 and a corresponding number of ridges 56. Alternative embodiments may include more or fewer flutes 58 and/or ridges 56. For example, the meter roller 52 may include 2, 4, 6, 8, 10, 12, 14, 16, 18, 20, or more flutes 58 and/or ridges 56. In addition, the depth of the flutes 58 and/or the height of the ridges 56 are configured to accommodate the material 50 within the storage tank 26. For example, a meter roller 52 having deeper flutes 58 and fewer ridges 56 may be employed for larger seeds, while a meter roller 52 having shallower flutes 58 and more ridges 56 may be employed for smaller seeds. Other parameters such as flute pitch (i.e., rotation relative to a longitudinal axis) and flute angle (i.e., rotation relative to a radial axis) may also be varied in alternative embodiments.

For a particular meter roller configuration, the rotation rate of the meter roller 52 controls the flow of material 50 into the air stream 48. Specifically, as the meter roller 52 rotates, material is transferred through an opening 60 in the metering system 32 into the conduit 46. The material then mixes with air from the air source 34, thereby forming an air/material mixture 62. The mixture then flows to the row units of the implement 10 via the pneumatic conduits, where the seeds and/or fertilizer are deposited within the soil. The rate that the product flows through the conduit 46 is controlled by the air source 34. Specifically, the air source 34 may increase the flow rate of the air stream 48, and thereby increase the flow rate of the air/material mixture 62. Further, the air source 34 may decrease the flow rate of the air stream 48, and thereby decrease the flow rate of the air/material mixture 62.

Figure 3:
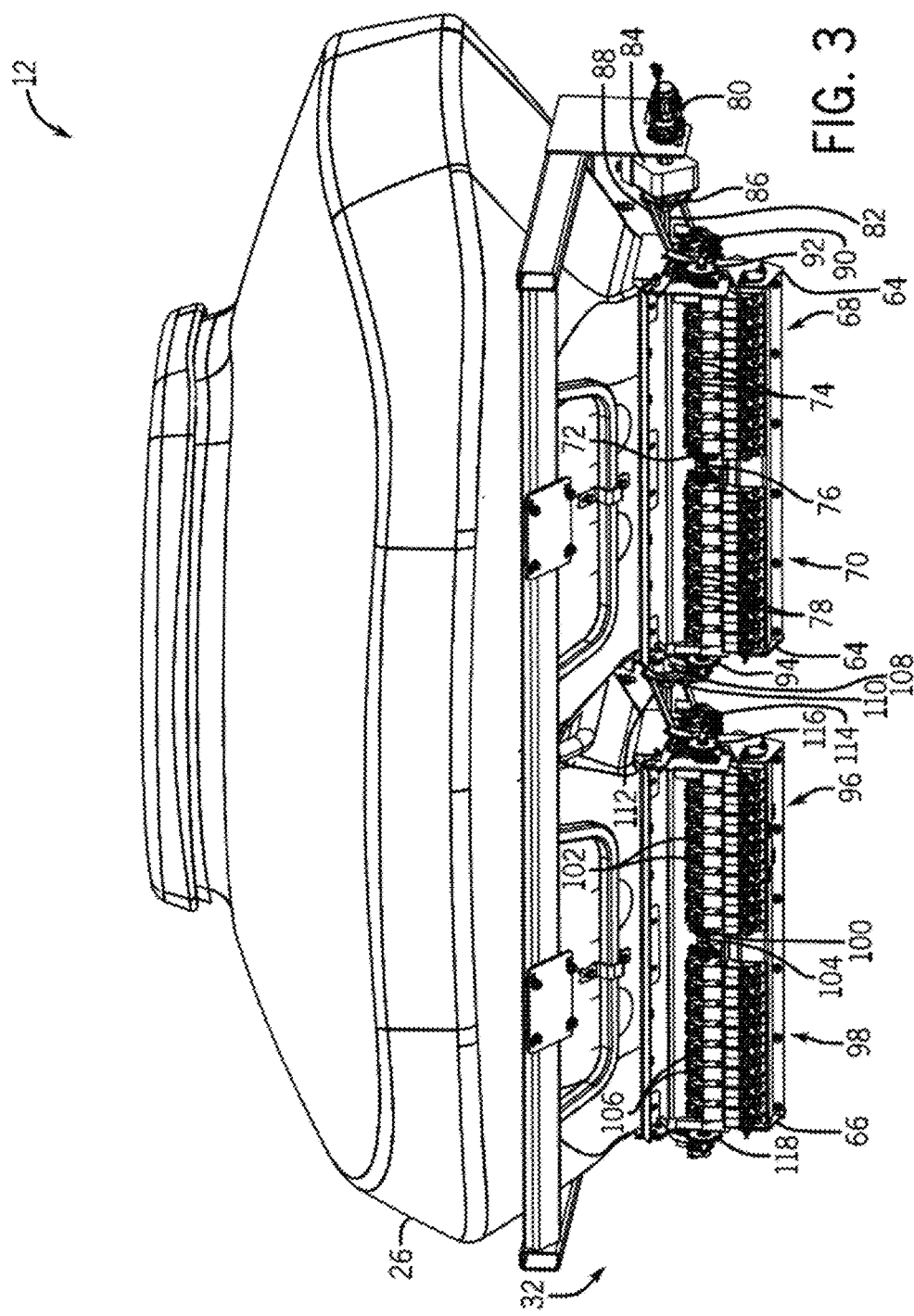
FIG. 3 is a front perspective view of an embodiment of an air system employing a metering system having multiple sectioned meter box assemblies.

FIG. 3 is a front perspective view of an embodiment of the air system 12 employing the metering system 32 having multiple sectioned meter box assemblies. Specifically, the metering system 32 includes a first meter box assembly 64 and a second meter box assembly 66. Further, the first meter box assembly 64 includes a first section 68 and a second section 70. In the present embodiment, the first and second sections 68 and 70 are configured to operate independently. In other embodiments, the first and second sections 68 and 70 may be configured to operate together (e.g., with synchronized rotation). The first section 68 includes a first metering shaft 72 extending through a first set of meter rollers 74, and the second section 70 includes a second metering shaft 76 extending through a second set of meter rollers 78.

The first metering shaft 72 and the second metering shaft 76 are driven in rotation by a drive unit 80. Specifically, the drive unit 80 drives a drive shaft 82. A clutch 84 is used to selectively engage a first drive sprocket 86 with the drive shaft 82 to transmit torque between the drive shaft 82 and the first drive sprocket 86. Accordingly, when the first drive sprocket 86 is clutchably engaged with the drive shaft 82, rotation of the drive shaft 82 drives the first drive sprocket 86 to rotate. Conversely, when the first drive sprocket 86 is not clutchably engaged with the drive shaft 82, rotation of the drive shaft 82 does not drive the first drive sprocket 86 in rotation. A chain 88 extends between the first drive sprocket 86 and a first driven sprocket 90. Furthermore, in the present embodiment, the first driven sprocket 90 drives a first metering sprocket 92. The first metering sprocket 92 is attached to the first metering shaft 72 such that rotation of the first metering sprocket 92 drives the first metering shaft 72 to rotate. As will be appreciated, when the first metering shaft 72 rotates, the first set of meter rollers 74 rotates to meter agricultural product. This arrangement results in the clutch 84 controlling the first metering shaft 72. A second metering sprocket 94 is attached to the second metering shaft 76 such that rotation of the second metering sprocket 94 drives the second metering shaft 76 to rotate. As may be appreciated, a clutch may be used to selectively engage a drive sprocket with the drive shaft 82 to transmit torque between the drive shaft 82 and a driven sprocket used to drive the second metering sprocket 94.

The second meter box assembly 66 is arranged similarly to the first meter box assembly 64. Specifically, the second meter box assembly 66 also includes a first section 96 and a second section 98. As will be appreciated, in certain embodiments, the first section 96 of the second meter box assembly 66 may be considered a third section of the metering system 32. Likewise, the second section 98 of the second meter box assembly 66 may be considered a fourth section of the metering system 32. In the present embodiment, the first and second sections 96 and 98 of the second meter box assembly 66 are configured to operate independently. In other embodiments, the first and second sections 96 and 98 may be configured to operate together (e.g., with synchronized rotation). The first section 96 includes a third metering shaft 100 extending through a third set of meter rollers 102, and the second section 98 includes a fourth metering shaft 104 extending through a fourth set of meter rollers 106.

The third metering shaft 100 and the fourth metering shaft 104 are also driven in rotation by the drive unit 80. Specifically, a clutch 108 is used to selectively engage a third drive sprocket 110 with the drive shaft 82 to transmit torque between the drive shaft 82 and the third drive sprocket 110. Accordingly, when the third drive sprocket 110 is clutchably engaged with the drive shaft 82, rotation of the drive shaft 82 drives the third drive sprocket 110 to rotate. Conversely, when the third drive sprocket 110 is not clutchably engaged with the drive shaft 82, rotation of the drive shaft 82 does not drive the third drive sprocket 110 in rotation. A chain 112 extends between the third drive sprocket 110 and a third driven sprocket 114. Furthermore, in the present embodiment, the third driven sprocket 114 drives a third metering sprocket 116. The third metering sprocket 116 is attached to the third metering shaft 100 such that rotation of the third metering sprocket 116 drives the third metering shaft 100 to rotate. As will be appreciated, when the third metering shaft 100 rotates, the third set of meter rollers 102 rotates to meter agricultural product. This arrangement results in the clutch 108 controlling the third metering shaft 100. A fourth metering sprocket 118 is attached to the fourth metering shaft 104 such that rotation of the fourth metering sprocket 118 drives the fourth metering shaft 104 to rotate. As may be appreciated, a clutch may be used to selectively engage a drive sprocket with the drive shaft 82 to transmit torque between the drive shaft 82 and a driven sprocket used to drive the fourth metering sprocket 118.

As discussed above, although only two clutches 84 and 108 are included in the metering system 32 shown in FIG. 3, the metering system 32 may include four separate clutches so that each of the metering shafts 72, 76, 100, and 104 may be independently driven to rotate. As such, multiple portions of the metering system 32 may be controlled to selectively meter agricultural product to corresponding portions of the implement, thereby reducing excess distribution of agricultural product. Specifically, the first metering shaft 72 may be used to control flow of agricultural product to a first corresponding section of the implement 10, the second metering shaft 76 may be used to control flow of agricultural product to a second corresponding section of the implement 10, the third metering shaft 100 may be used to control flow of agricultural product to a third corresponding section of the implement 10, and the fourth metering shaft 104 may be used to control flow of agricultural product to a fourth corresponding section of the implement 10. Each of the clutches in the metering system 32 may be any suitable clutch, such as an electric clutch or a wrap spring clutch.

Figure 4:
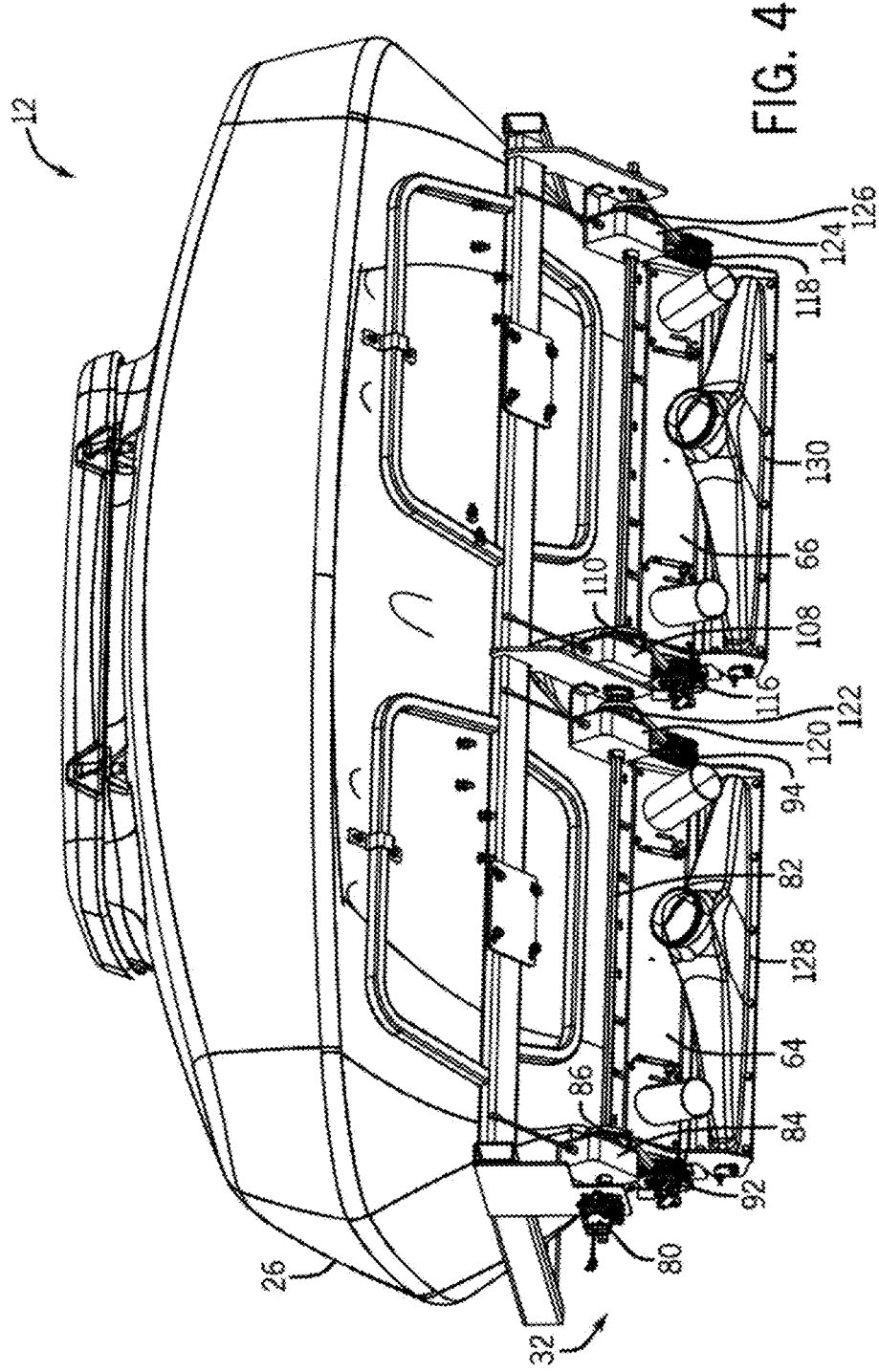
FIG. 4 is a rear perspective view of the air system of FIG. 3.

FIG. 4 is a rear perspective view of the air system 12 of FIG. 3. A clutch 120 is used to selectively engage a second drive sprocket 122 with the drive shaft 82 to transmit torque between the drive shaft 82 and the second drive sprocket 122. Accordingly, when the second drive sprocket 122 is clutchably engaged with the drive shaft 82, rotation of the drive shaft 82 drives the second drive sprocket 122 to rotate. Conversely, when the second drive sprocket 122 is not clutchably engaged with the drive shaft 82, rotation of the drive shaft 82 does not drive the second drive sprocket 122 in rotation. Although not illustrated, a chain may be coupled to the second drive sprocket 122, and used to drive the second metering sprocket 94.

As illustrated, a clutch 124 is used to selectively engage a fourth drive sprocket 126 with the drive shaft 82 to transmit torque between the drive shaft 82 and the fourth drive sprocket 126. Accordingly, when the fourth drive sprocket 126 is clutchably engaged with the drive shaft 82, rotation of the drive shaft 82 drives the fourth drive sprocket 126 to rotate. Conversely, when the fourth drive sprocket 126 is not clutchably engaged with the drive shaft 82, rotation of the drive shaft 82 does not result drive the fourth drive sprocket 126 in rotation. Although not illustrated, a chain may be coupled to the fourth drive sprocket 126, and used to drive the fourth metering sprocket 118. As previously discussed, the air source 34 may provide the air stream 48 to the metering system 32. In the present embodiment, the air stream 48 may be directed to a back end of the meter box assemblies 64 and 66. Specifically, the air stream 48 may be directed into a first air manifold 128 coupled to the first meter box assembly 64, and into a second air manifold 130 coupled to the second meter box assembly 66. As previously described, multiple portions of the metering system 32 may be controlled to selectively meter agricultural product to corresponding sections of the implement, thereby reducing excess distribution of agricultural product.

Figure 5:
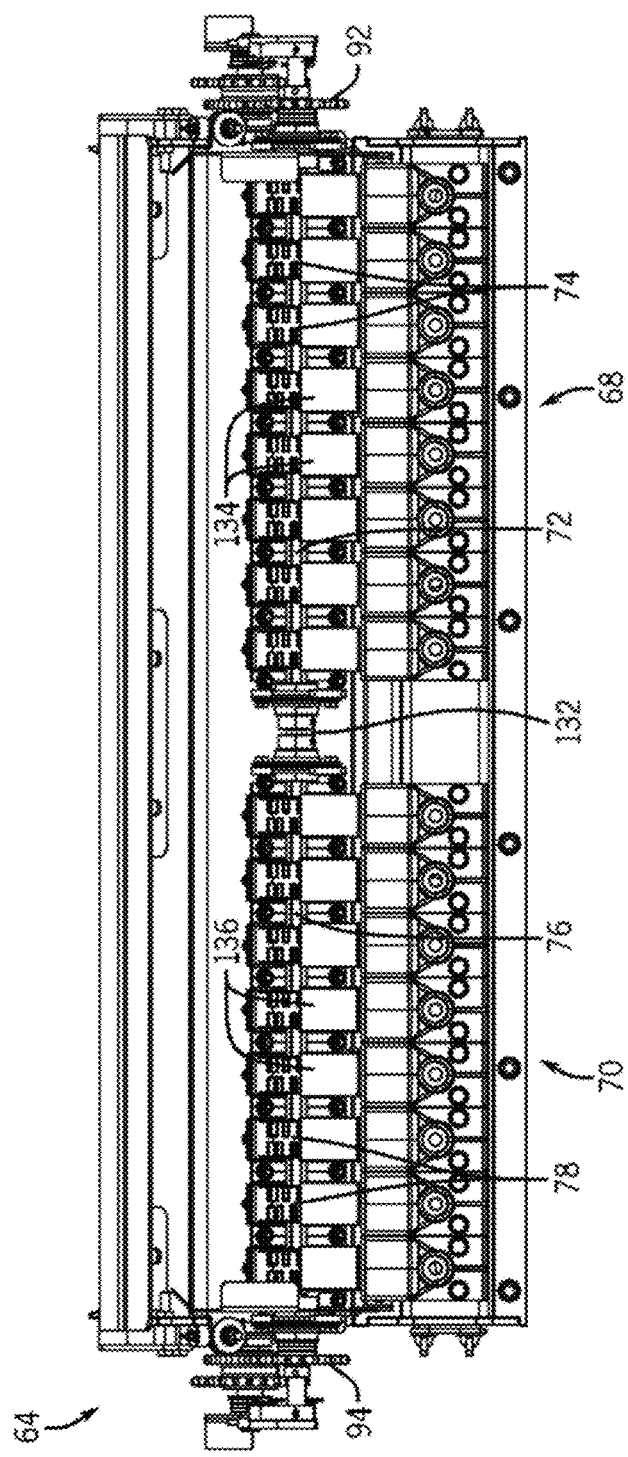
FIG. 5 is a front view of a sectioned meter box assembly of FIG. 3.

FIG. 5 is a front view of the first meter box assembly 64 of FIG. 3. In the illustrated embodiment, the first metering shaft 72 and the second metering shaft 76 converge at a central location 132. However, at the central location 132, the first metering shaft 72 and the second metering shaft 76 are not coupled to one another. Accordingly, the first metering shaft 72 and the second metering shaft 76 operate independently from one another. In certain embodiments, a bearing assembly may be disposed between the first metering shaft 72 and the second metering shaft 76 at the central location 132. As illustrated, receptacles 134 direct agricultural product to each of the first set of meter rollers 74 and receptacles 136 direct agricultural product to each of the second set of meter rollers 78.

Figure 6:
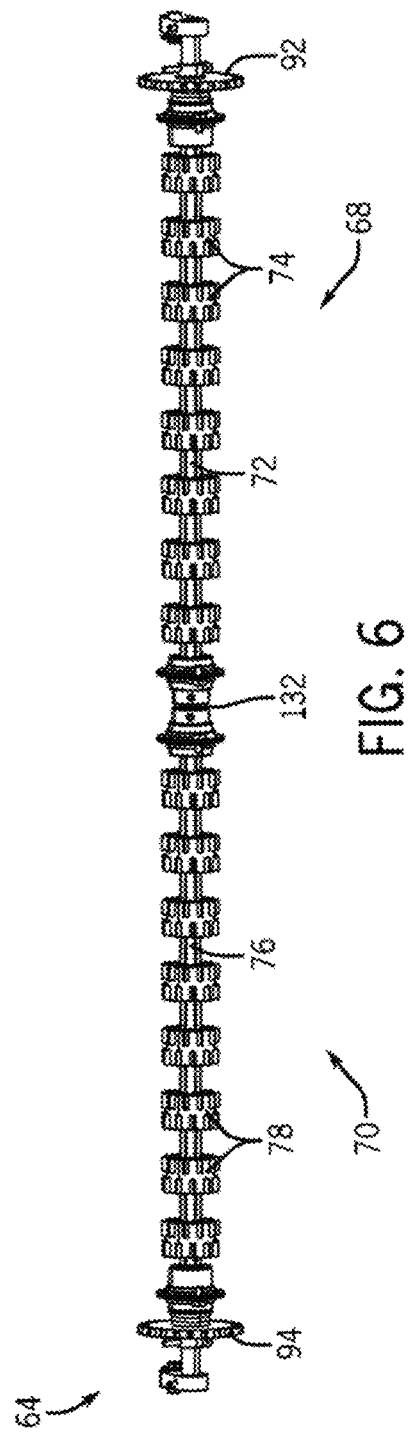
FIG. 6 is a front view of a meter roller assembly of the sectioned meter box assembly of FIG. 5.

FIG. 6 is a front view of a meter roller assembly of the first meter box assembly 64 of FIG. 5. In the illustrated embodiment, the meter rollers of the first set 74 are disposed at intervals along the first metering shaft 72. Furthermore, the meter rollers of the second set 78 are disposed at intervals along the second metering shaft 76. As will be appreciated, rotation of the first metering shaft 72 rotates the first set of meter rollers 74. In addition, rotation of the second metering shaft 76 rotates the second set of meter rollers 78. Prior to operation of the meter box assembly 64, cover plates may be disposed around certain meter rollers of the first set 74 and/or the second set 78 to block flow of agricultural product through the meter rollers, which may reduce excess distribution of agricultural product from the metering system 32.

Figure 7:
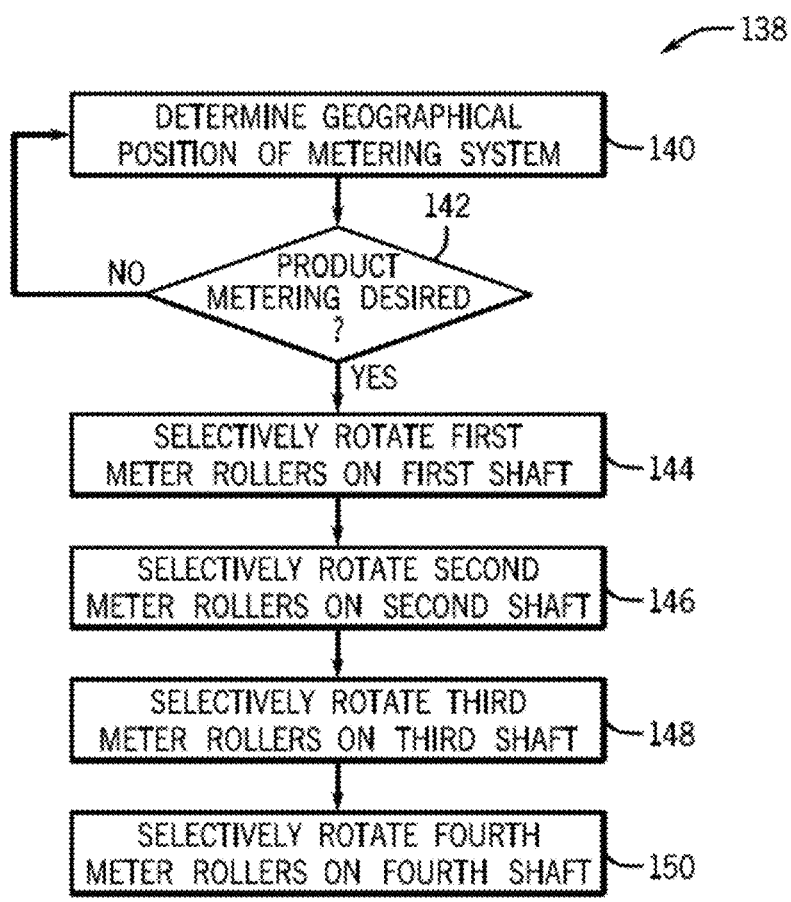
FIG. 7 is a flow chart of an embodiment of a method of metering agricultural product from a sectioned metering box assembly.

FIG. 7 is a flow chart of an embodiment of a method 138 for metering agricultural product from a sectioned metering box assembly. At block 140, a control device (e.g., control assembly 40) determines a geographic position of the metering system 32 (e.g., obtained by a spatial locating system such as the GPS receiver 44). Next, at block 142, the control device determines whether product metering is desired at the geographic position. If product metering is not desired, the method 138 returns to block 140. However, if product metering is desired, the control device selectively rotates appropriate metering shafts (each coupled to multiple meter rollers) of the metering system. For example, at block 144, the control device selectively rotates a first shaft (e.g., first metering shaft 72) coupled to a first set of meter rollers, while at block 146, the control device selectively rotates a second shaft (e.g., second metering shaft 78) coupled to a second set of meter rollers. As another example, at block 148, the control device selectively rotates a third shaft (e.g., third metering shaft 100) coupled to a third set of meter rollers, while at block 150, the control device selectively rotates a fourth shaft (e.g., fourth metering shaft 104) coupled to a fourth set of meter rollers. Each of the first, second, third, and fourth metering shafts are configured to rotate independently from one another. As will be appreciated, in certain embodiments, a manual input may be received to determine whether to selectively rotate the first, second, third, and/or fourth metering shafts. Using such a method, agricultural product may be selectively placed at desired locations of a field, thereby reducing excess distribution of agricultural product.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A metering system for distributing an agricultural product in a field, comprising:
 a drive shaft configured to be coupled to a drive input and to be driven in rotation by the drive input;
 a first meter box assembly having a first housing, a first metering shaft extending through a first plurality of meter rollers within the first housing, and a second metering shaft extending through a second plurality of meter rollers within the first housing; and
 a second meter box assembly having a second housing, a third metering shaft extending through a third plurality of meter rollers within the second housing, and a fourth metering shaft extending through a fourth plurality of meter rollers within the second housing;
 wherein each metering shaft is configured to be independently driven by the drive shaft;
 wherein the first meter box assembly comprises a first plurality of receptacles, each meter roller of the first and second pluralities of meter rollers is disposed within a respective receptacle of the first plurality of receptacles, and the first plurality of receptacles is disposed within the first housing;
 wherein the second meter box assembly comprises a second plurality of receptacles, each meter roller of the third and fourth pluralities of meter rollers is disposed within a respective receptacle of the second plurality of receptacles, and the second plurality of receptacles is disposed within the second housing.

2. The metering system of claim 1, wherein the first meter box assembly comprises a bearing assembly disposed between the first metering shaft and the second metering shaft.

3. The metering system of claim 1, wherein the drive shaft comprises a plurality of drive sprockets, and each drive sprocket is configured to drive a respective driven sprocket of a corresponding metering shaft.

4. The metering system of claim 3, comprising a chain extending between each drive sprocket and the respective driven sprocket.

5. The metering system of claim 1, comprising a respective clutch for each metering shaft, each clutch being selectively engageable to transmit torque between the drive shaft and a respective metering shaft.

6. The metering system of claim 1, wherein each metering shaft is configured to be selectively disengaged from the drive shaft to block agricultural product from being metered by a respective plurality of meter rollers.

7. The metering system of claim 1, comprising control circuitry configured to selectively control rotation of the metering shafts.

8. The metering system of claim 7, comprising a spatial locating system configured to provide a geographical position of the metering system to the control circuitry.

9. The metering system of claim 8, wherein the control circuitry is configured to control rotation of each metering shaft based upon the geographical position of the metering system obtained from the spatial locating system.

10. The metering system of claim 9, wherein the spatial locating system comprises a Global Positioning System receiver.

11. A metering system for distributing an agricultural product in a field, comprising:
 a drive shaft assembly configured to be coupled to a drive input and to be driven in rotation by the drive input; and
 a meter box assembly having a housing, a first metering shaft extending through a first plurality of meter rollers within the housing, and a second metering shaft extending through a second plurality of meter rollers within the housing, wherein the first and second metering shafts are configured to be independently driven by the drive shaft assembly;

wherein the meter box assembly comprises a plurality of receptacles, each meter roller of the first and second pluralities of meter rollers is disposed within a respective receptacle of the plurality of receptacles, and the plurality of receptacles is disposed within the housing.

12. The metering system of claim 11, comprising a first clutch configured to transmit torque to the first metering shaft and a second clutch configured to transmit torque to the second metering shaft.

13. The metering system of claim 11, wherein clutch comprises an electric clutch.

14. A method for metering agricultural product from an agricultural product metering system, comprising:

selectively rotating a first plurality of meter rollers coupled to a first metering shaft in a first housing of a first meter box assembly, wherein each meter roller of the first plurality of meter rollers is disposed within a respective receptacle of a first plurality of receptacles, and the first plurality of receptacles is disposed within the first housing; and selectively rotating a second plurality of meter rollers coupled to a second metering shaft in the first housing of the first meter box assembly, wherein each meter roller of the second plurality of meter rollers is disposed within a respective receptacle of the first plurality of receptacles;

wherein the first plurality of meter rollers and the second plurality of meter rollers are configured to rotate independently from one another.

15. The method of claim 14, comprising selectively rotating the first and second pluralities of meter rollers based upon a geographical position of the metering system obtained from a spatial locating system.

16. The method of claim 15, wherein the spatial locating system comprises a Global Positioning System receiver.

17. The method of claim 14, comprising selectively rotating the first and second pluralities of meter rollers based upon a manual selection.

18. The method of claim 14, comprising:

selectively rotating a third plurality of meter rollers coupled to a third metering shaft in a second housing of a second meter box assembly, wherein each meter roller of the third plurality of meter rollers is disposed within a respective receptacle of a second plurality of receptacles, and the second plurality of receptacles is disposed within the second housing; and selectively rotating a fourth plurality of meter rollers coupled to a fourth metering shaft in the second housing assembly of the second meter box assembly, wherein each meter roller of the fourth plurality of meter rollers is disposed within a respective receptacle of the second plurality of receptacles;

wherein the first plurality of meter rollers, the second plurality of meter rollers, the third plurality of meter rollers, and the fourth plurality of meter rollers are configured to rotate independently from one another.

* * * * *